US008819305B2

(12) United States Patent
Schmidt et al.

(10) Patent No.: US 8,819,305 B2
(45) Date of Patent: Aug. 26, 2014

(54) DIRECTLY PROVIDING DATA MESSAGES TO A PROTOCOL LAYER

(75) Inventors: Daren J. Schmidt, Chandler, AZ (US); Bryan R. White, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 12/618,867

(22) Filed: Nov. 16, 2009

(65) Prior Publication Data

US 2011/0116511 A1    May 19, 2011

(51) Int. Cl.
| | |
|---|---|
| *G06F 13/38* | (2006.01) |
| *H04L 12/56* | (2006.01) |
| *G06F 12/08* | (2006.01) |
| *G06F 13/40* | (2006.01) |
| *G06F 13/42* | (2006.01) |

(52) U.S. Cl.
CPC .............. *H04L 47/39* (2013.01); *G06F 13/385* (2013.01); *G06F 12/0831* (2013.01); *G06F 13/4068* (2013.01); *G06F 13/4221* (2013.01); *H04L 47/30* (2013.01)
USPC ................. 710/29; 710/35; 710/36; 711/147; 370/381; 370/382; 370/383

(58) Field of Classification Search
None
See application file for complete search history.

(56) References Cited

U.S. PATENT DOCUMENTS

| | | | |
|---|---|---|---|
| 5,898,841 A * | 4/1999 | Higgins ........................ 709/236 |
| 6,009,488 A | 12/1999 | Kavipurapu | |
| 2004/0111535 A1 * | 6/2004 | Boucher et al. ............... 709/250 |
| 2005/0088967 A1 | 4/2005 | Cen | |
| 2005/0144341 A1 | 6/2005 | Schmidt et al. | |
| 2005/0259651 A1 * | 11/2005 | Yashima ........................ 370/389 |
| 2005/0262250 A1 | 11/2005 | Batson et al. | |
| 2007/0053350 A1 * | 3/2007 | Spink et al. ................... 370/381 |
| 2008/0112425 A1 | 5/2008 | Barker et al. | |
| 2008/0244195 A1 * | 10/2008 | Sistla et al. .................... 711/147 |

(Continued)

FOREIGN PATENT DOCUMENTS

| | | |
|---|---|---|
| CN | 1620063 | 5/2005 |
| WO | WO2009008948 | 1/2009 |

OTHER PUBLICATIONS

Intel, "An Introduction to the Intel QuickPath Interconnect," Jan. 2009, pp. 1-22.

(Continued)

*Primary Examiner* — Faruk Hamza
*Assistant Examiner* — Andrew Oh
(74) *Attorney, Agent, or Firm* — Trop, Pruner & Hu, P.C.

(57) ABSTRACT

In one embodiment, the present invention provides for a layered communication protocol for a serial link, in which a link layer is to receive and forward a message to a protocol layer coupled to the link layer with a minimal amount of buffering and without maintenance of a single resource buffer for adaptive credit pools where all message classes are able to consume credits. By performing a message decode, the link layer is able to steer non-data messages and data messages to separate structures within the protocol layer. Credit accounting for each message type can be handled independently where the link layer is able to return credits immediately for non-data messages. In turn, the protocol layer includes a shared buffer to store all data messages received from the link layer and return credits to the link layer for these messages when the data is removed from the shared buffer. Other embodiments are described and claimed.

19 Claims, 3 Drawing Sheets

(56) References Cited

U.S. PATENT DOCUMENTS

| | | | |
|---|---|---|---|
| 2009/0006871 A1* | 1/2009 | Liu et al. | 713/300 |
| 2009/0138629 A1* | 5/2009 | Chadha et al. | 710/29 |
| 2009/0164739 A1* | 6/2009 | Harikumar et al. | 711/153 |
| 2011/0032947 A1* | 2/2011 | Brueggen | 370/412 |

OTHER PUBLICATIONS

U.S. Appl. No. 12/286,324, filed Sep. 30, 2008, entitled "Providing a Set Aside Mechanism for Posted Interrupt Transactions," by Bryan R. White.

Patent Cooperation Treaty, Notification of Transmittal of the International Search Report and the Written Opinion of the International Searching Authority mailed May 30, 2011 in International application No. PCT/US2010/050013.

State Intellectual Property Office of the People's Republic of China, Office Action and Search Report mailed Mar. 12, 2013 in Chinese application No. 201010293356.0.

PRC State Intellectual Property Office, "Notice of Granting Patent Right for Invention," issued Nov. 25, 2013 in corresponding Chinese application No. 201010293356.0.

* cited by examiner

US 8,819,305 B2

DIRECTLY PROVIDING DATA MESSAGES TO A PROTOCOL LAYER

BACKGROUND

Computer systems are generally formed from multiple semiconductor and other components that are coupled together. For example, typical systems include a central processing unit (CPU) in addition to possibly one or more other processors that can be coupled to a motherboard. These processors in turn can be coupled to other components such as memory controllers, input/output hubs, other semiconductor devices, and other system components such as a mass storage, e.g., by way of interconnects configured on the motherboard or by other such connections.

To communicate between different components, a communication protocol can be used. Many such protocols provide for different layers to handle communication tasks. In some protocols, a physical layer is the layer that actually transmits messages along an interconnect and receives and processes messages from a corresponding physical layer of one or more other devices. In turn, this physical layer can be coupled to a link layer that performs various functions such as error detection and correction. In turn, the link layer can be coupled to a protocol layer which receives message packets from the link layer and further processes them to thus route them to their destination locations within a semiconductor component. Oftentimes, the link layer will include a large buffer to temporarily store all incoming messages. However, this buffer is responsible for a great increase in die consumption, as well as raising the complexity of handling incoming messages.

DETAILED DESCRIPTION

In various embodiments, a communication protocol may be provided with a link layer that does not include any substantial buffering circuitry. In this way, incoming messages can be minimally processed in the link layer and provided directly to a protocol layer for further handling. As a result, the size of any buffers within the protocol layer can be reduced and simplified in comparison to a large link layer buffer.

Figure 1:
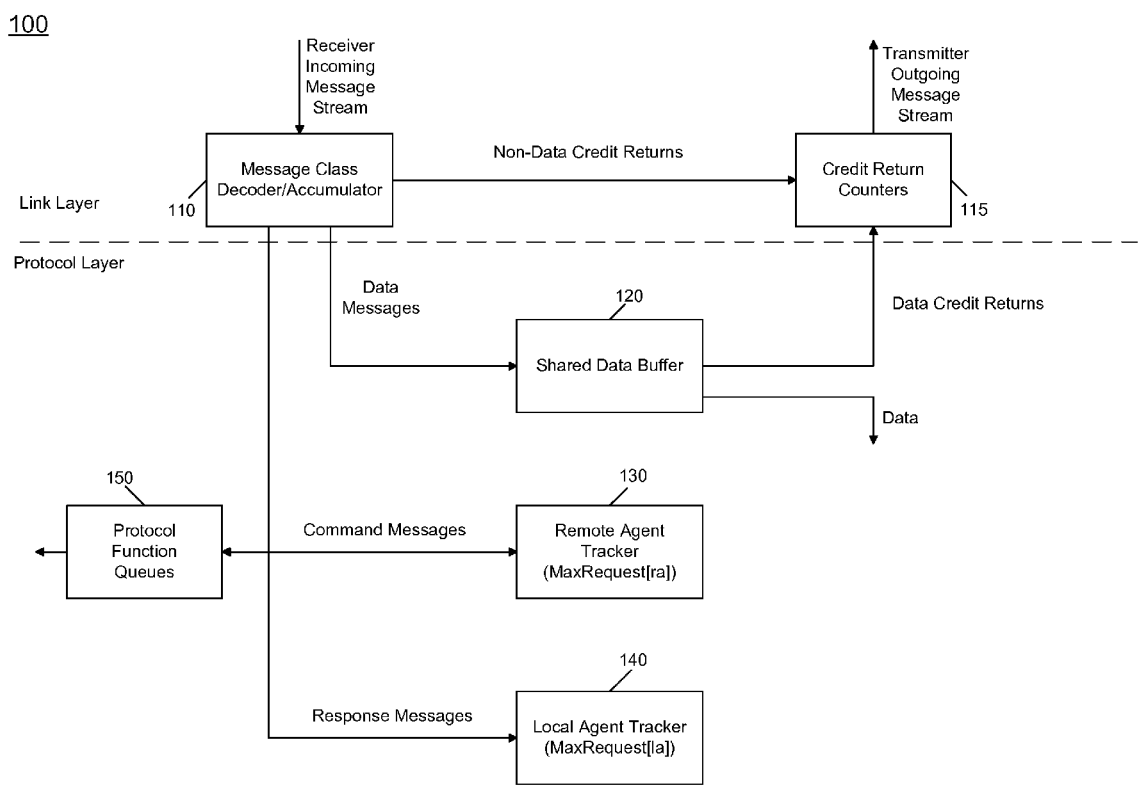
FIG. 1 is a block diagram of a portion of a communication protocol in accordance with an embodiment of the present invention.

Referring now to FIG. 1, shown is a block diagram of a portion of a layered communication protocol in accordance with an embodiment of the present invention. Specifically, FIG. 1 shows a portion of a communication protocol 100 to handle both incoming messages and outgoing messages. The portion shown in FIG. 1 includes a link layer portion and a protocol layer portion. Understand that for different protocols, additional layers including a physical layer, routing layer, and so forth may also be present. Further, note that for ease of illustration, the portions of the layers shown in FIG. 1 primarily deal with input communications, while the main transmitter circuitry of these layers is not shown to not obscure the embodiment described. As one example, the communication protocol of FIG. 1 may correspond to a protocol for use with a link configured to operate according to the Intel® QuickPath Interconnect (QPI) protocol which is for point-to-point interconnects and provides for a multi-layer communication protocol between various semiconductor devices such as processors, chipsets and so forth.

As seen in FIG. 1, incoming messages may be received and provided to a message class decoder/accumulator 110. This link layer circuitry may be of minimal complexity and may include support for only a small message portion, e.g., several flits, where a flit may correspond to a minimum-sized flow control unit for a given communication protocol. As one example, the flit width may be 80 bits, although the scope of the present invention is not limited in this regard. Decoder/accumulator 110 is used to determine the type of message received and to direct it to its appropriate location in the protocol layer. In one embodiment, decoder/accumulator 110 may analyze a header or other initial data of an incoming message to determine its message class.

For a received message that does not include data (i.e., a non-data message), a credit return may be provided directly to credit return counters 115, also of the link layer, to enable credits to be returned back to the initiator of the message without delays associated with the protocol layer. In general, the counters 115 may represent a counter for each message type and virtual network (VN) so that credits for the different credit types can be independently maintained. In one embodiment, there can be three virtual networks, VN0, VN1 and VNA. The VN0/VN1 virtual networks are essentially a bundle of virtual channels, where each message class within the virtual network has its own independent buffering and flow control credits. Within these virtual networks, credits for a given message class are returned on a per message basis. The VNA is an adaptive virtual network that acts as a shared resource buffer across all message classes, which means the flow control credit pool for this virtual network is also shared across all message classes. Messages transmitted within this network are decomposed into flow control units (i.e., flits) and credits returned for this network are at a flit granularity.

Various message classes may be available in different embodiments. In one particular embodiment, multiple message classes may be present, each of which may travel on one or more of the virtual networks. These virtual networks thus provide independent transmission channels (i.e., virtual channels) to the protocol layer to allow sharing of a physical channel. In this embodiment, the message classes may include a home (HOM) message class, a non-coherent standard (NCS) message class, a non-data response (NDR) message class, a data response standard (DRS) message, and a non-coherent bypass (NCB) message class.

After decoding, decoder/accumulator 110 will provide the message contents to an appropriate location within the protocol layer. For example, for data messages the data payload may be provided to a shared data buffer 120 of the protocol layer and the data command information (e.g., header) is provided to one of the trackers, namely a remote agent tracker 130 or a local agent tracker 140. For other non-data carrying messages, the message information is provided to one or more of the trackers. The remote agent and the local agent tracking structures track outstanding requests received from a fabric (e.g., interconnect) for a home agent (HA). Specifically tracker 130 tracks requests made by a remote agent and tracker 140 tracks requests that are issued by the local agent. As one example, the remote agent may be a caching agent of a processor, as will be discussed below, while the local agent may be a caching agent of a chipset, where the chipset further includes a home agent, also discussed below. Thus in one example implementation, the communication protocol and the layers shown in FIG. 1 may be with regard to a view of interconnect structures for a chipset component.

In one embodiment, remote agent tracker 130 is sized for the maximum number of requests a remote agent is allowed to have outstanding at any given time to the HA (MaxRequest[ra]). For every remote agent on the fabric that can make requests to the HA, the HA can have a tracking structure associated with it (in the illustration of FIG. 1 remote agent tracker 130 can be implemented as a multi-dimensional array). Accordingly, the depth of the local agent tracker 140 represents the maximum number of requests a local agent is allowed to have outstanding at any given time to the HA (MaxRequest[la]). This structure can also be implemented as a multi-dimensional array. The total number of messages that can be outstanding on the fabric at any given time targeting this HA is, therefore, MaxRequest[ra]+MaxRequest[la]. These tracking structures may store the command information (e.g., address, request type, opcode, transaction ID, etc.) and the status of the transaction within the chip (e.g., has it been dispatched, has the data been received, can a completion be sent back, etc). In contrast, any data from a remote agent that is associated with the command is stored in the shared data buffer 120. A data message stores the same command information within a tracker that is stored with a non-data message, with the addition of a shared data buffer address where the data payload associated with the command is located. By splitting the destination of the non-data messages from the data payloads, the maintenance of the adaptive virtual network can be greatly simplified.

In addition to the trackers, one or more protocol function queues 150 may store information regarding the message, the details of which will be discussed further below. As further seen, credit returns for data messages may be sent from shared data buffer 120 to credit return counters 115. In various implementations, such credit returns may be provided when data is removed from the shared data buffer. While shown with this particular implementation in the embodiment of FIG. 1, the scope of the present invention is not limited in this regard.

Note that the link layer has very minimal buffering implemented as part of decoder/accumulator 110. In one embodiment, this buffering may be just enough to accumulate the largest sized header (e.g., 3 flits) and a half cache line of data (e.g., 4 flits) for data messaging. There is no backpressure from the protocol layer to the link layer, so once the full message header and/or data has been accumulated within the link layer, it is sent directly to the protocol layer. The protocol layer, therefore, guarantees that there will be resources available for all received messages and data.

To keep buffering to a minimum, data for writebacks from a remote agent (e.g., DRS and NCB message classes) is kept within a separate data structure, namely shared data buffer 120 of the protocol layer. The minimum depth of this data structure can be sized to account for the adaptive virtual network (VNA) credit pool plus one cache line per non-adaptive virtual network (i.e. VN0 and VN1) per data message class (e.g., DRS and NCB). Sized in this manner, this data structure physically represents the virtual network credit pools, but only for data message classes. Credits for these message classes are returned only when the data has been moved out of the data structure. In one embodiment, a cache line of data associated with a request is stored within the data structure contiguously. In this way, the protocol layer only needs the starting address of the data within the structure to unload it. Further, the amount of buffering needed within this structure is much less than if each tracker had to store a cache line of data for each request/response the home agent could potentially receive (i.e., MaxRequest[ra]+MaxRequest[la]). Instead, the trackers store minimal information associated with request/response messages.

Protocol function queues 150 represent a dedicated ordering queue (e.g., a first-in first-out (FIFO)) for each specific function the protocol layer is responsible for. Examples of such operations include dispatching coherent requests to memory, dispatching non-coherent requests to IO agents, etc. Such queues may be thin, in that they only need to store a request identifier (ID) which is used to access the full request information within the message's associated tracker, along with any other miscellaneous information needed for that particular function (e.g., location of data for a writeback transaction, type of writeback (implicit/explicit), target information, etc). In one embodiment, each queue depth can be sized to handle the maximum number of messages that could be received for that given function. As an example, an ordering queue may be sized to accept MaxRequest[ra] or MaxRequest[ra]+MaxRequest[la] and may maintain a received order of entries in the ordering queue. In one embodiment, there may be six ordering queues, namely a dispatch ordering queue (to dynamic random access memory (DRAM)), a non-dispatch ordering queue (used to maintain coherency and serialize incoming traffic), a CPU re-dispatch ordering queue (used to resolve conflicts and dispatch CPU requests to DRAM a second time), an acknowledgment conflict (AckCnflt) ordering queue (used to process conflict handshake from CPU), an NCS ordering queue (all NCS messaging dispatched to IO agents through this queue), and an NCB ordering queue (all NCB messaging dispatched to IO agents through this queue). Note that in some embodiments, the protocol layer may run at a slower clock speed than the link layer and thus may operate on multiple messages in parallel.

In operation, as a local link layer receives a message from a fabric for this agent, it performs minimal accumulation in accumulator 110 for the message, based on the message class and opcode before passing the entire message to the protocol layer. The link layer receives all accumulated flits of a message successfully (e.g., confirms no cyclic redundancy cycle (CRC) errors) before it presents the message to the protocol layer. As the incoming messages are passed to the protocol layer, they are consumed by one or both of request trackers 130 and 140 based on the decoded message class and opcode information. In this way, the message will update a unique entry within the targeted data structure via the message's unique request ID which in one embodiment may correspond to the original requester's node ID and the transaction ID. Since the trackers within the protocol layer are sized for the maximum number of requests each agent can have outstanding to the HA, the protocol layer can guarantee resources for all incoming messages (e.g., MaxRequest[ra]+MaxRequest[la]). If a specific action is required to be taken on the incoming message (e.g., a request needs to be dispatched to memory), then the protocol layer will also load the ID of the request into the ordering queue of protocol function queues 150 dedicated to that function.

As the protocol layer guarantees all received messages will be consumed in real time, the link layer can return virtual network credits back to the remote agent as soon as the link layer successfully decodes the entire message in decoder/accumulator 110. The only exception to this rule is for cache line writebacks from the remote agent (e.g., DRS & NCB message classes), where the credits are returned only after the data has been moved out of the shared data buffer 120. Therefore, there is no complicated buffering requirement needed within the link layer beyond the simple message accumulators.

Thus, credits for non-data (e.g., HOM, NCS, and NDR) messages are accumulated and scheduled for return from the link layer via counters 115 upon successful receipt of all flits within the message. In turn, credits for data messages (e.g., DRS and NCB) (both header and data payload) are accumulated and scheduled for return only when the full data payload has been moved out of the shared data buffer 120.

Figure 2:
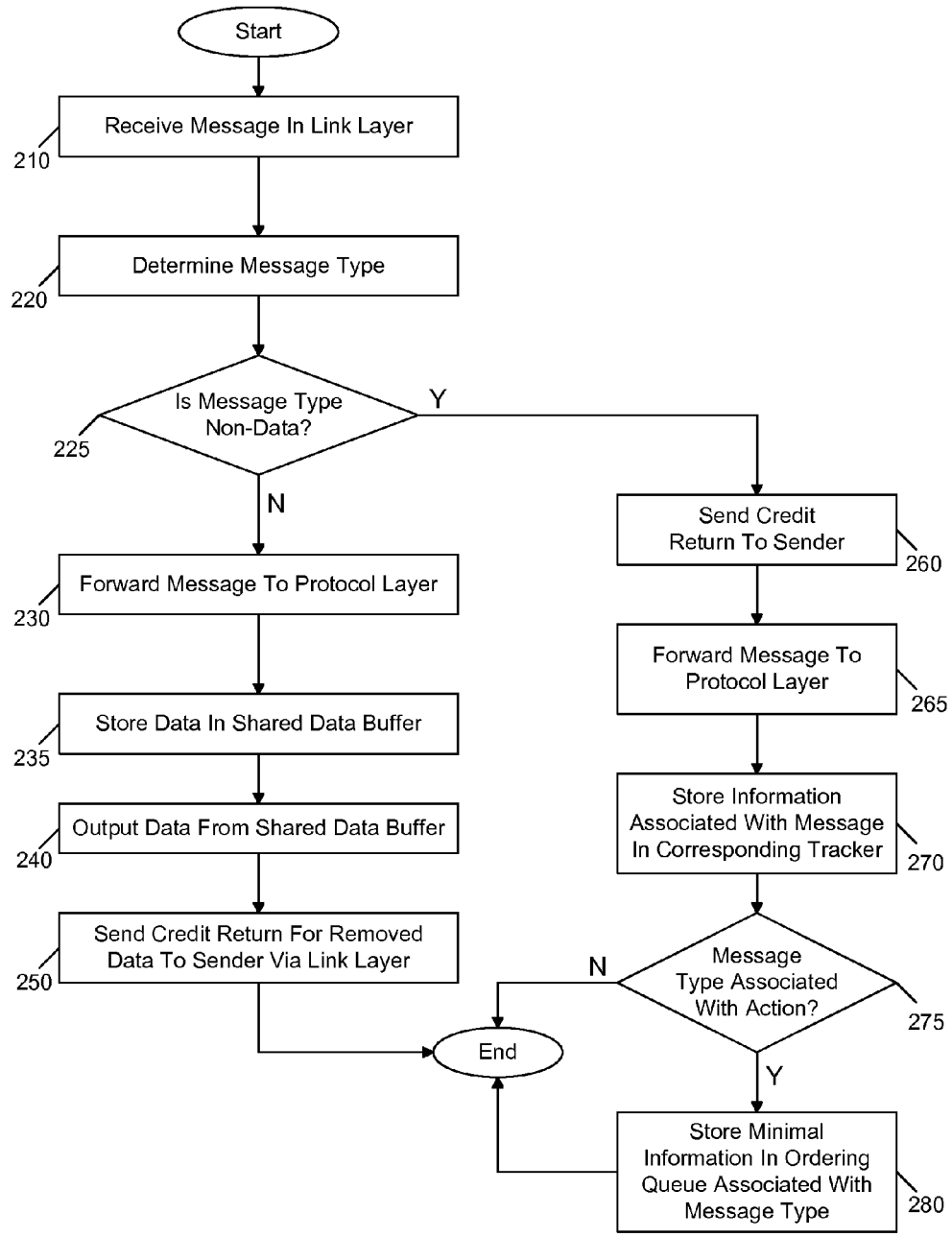
FIG. 2 is a flow diagram of a method in accordance with one embodiment of the present invention.

Referring now to FIG. 2, shown is a flow diagram of a method in accordance with one embodiment of the present invention. As shown in FIG. 2, method 200 may be used to handle incoming messages received from an interconnect of a communication protocol. As seen in FIG. 2, method 200 may begin by receiving a message in a link layer of an agent such as a home agent, which may be an agent corresponding to an owner or manager of a particular memory location that is subject of the message (block 210). Then, the type of message may be determined (block 220). For example, a message class decoder may be used to determine the message type based on a header of the message. Accordingly, the decoder may determine whether the message type is a non-data message type (diamond 225). If the message is a non-data type, e.g., a command or other such message, control passes to block 260. At block 260, a credit return may be sent to the sender directly from the link layer without the need for involving any operations in the protocol layer. Also, the received message may be forwarded to the protocol layer (block 265). Note that in various implementations, the operations of blocks 260 and 265 may be performed in parallel or serially, with either operation being performed first.

Referring still to FIG. 2, when the message is sent to the protocol layer, information associated with the message may be stored in a corresponding tracker of the protocol layer (block 270). While the scope of the present invention is not limited in this regard, the information stored may include a request ID, and certain metadata regarding the message such as the destination address, request type (e.g., read or write), opcode, coherency type, conflict information, and so forth. As an example, the protocol layer may include two types of trackers, one associated with the local agent(s) and one associated with the remote agent(s). Depending on the message type, information of the message may be stored in both trackers. Also, it may be determined whether the message type is associated with an action to be performed (diamond 275). If not, the handling of this message may be completed. Otherwise, control passes to block 280, where minimal information for the message may be stored in an ordering queue. More specifically, an identifier such as a request ID may be stored in an ordering queue such that when the entry of this queue is accessed to perform an operation for the corresponding message, additional information can be obtained from the corresponding tracker entry.

Referring still to FIG. 2, if the link layer determines that the message type is a data type, the message may be forwarded to the protocol layer (block 230). In the protocol layer, the data of this data message may be stored in a shared data buffer (block 235) and all of the command information (e.g., destination address, request type, data return, etc) is stored within the appropriate tracker, along with a data valid state. Then at a later time, e.g., when an operation associated with the message is performed, e.g., a write data operation to write the data from the buffer to a corresponding location, the data may be output, i.e., removed from the shared data buffer (block 240). After such removal of the data from the buffer, a credit return for that message may be sent from the protocol layer and through the link layer back to the sender (block 250). While shown with this particular implementation in the embodiment of FIG. 2, the scope of the present invention is not limited in this regard.

Using an embodiment of the present invention, the link layer can be greatly simplified as the need for a shared resource buffer that is responsible for sinking all messages transmitted within an adaptive virtual network can be avoided and instead the link layer is simply dedicated to ensuring data integrity and maintaining flow control on the fabric. As a result, gate count and complexity in regard to flow control can be reduced significantly. Instead of a large linked-list data structure that requires resource allocation logic and an arbitration scheme within a link layer to de-allocate messages and return credits, the link layer simply accumulates the header and/or data before issuing it to the protocol layer. The link layer does not have an unnatural arbitration point between it and the protocol layer that "second guesses" the ordering of message transmission chosen by the remote agent. Instead, an agent using an embodiment of the present invention processes the incoming messages in the order they are received off of the fabric. Assuming a protocol layer that is running slower than flit clock speeds, the link layer can naturally issue commands and move data concurrently within a single clock as there is no single serialization point, allowing for better throughput and lower latencies.

Still further, the burden of maintaining flow control within the link layer is significantly reduced. This is so, as flow control credits are returned as soon as the incoming messages are successfully decoded. This quick link layer credit release can occur because the incoming messages are routed directly to protocol layer data structures, and for non-data message classes, an arbitrary credit count can be advertised (the MaxRequest[*] parameters are then the limiting factor). The protocol layer can also process incoming messages in parallel (assuming a protocol layer that is operating at a speed slower than flit clock speeds) and also process incoming messages in the order they are received from the remote agent.

Figure 3:
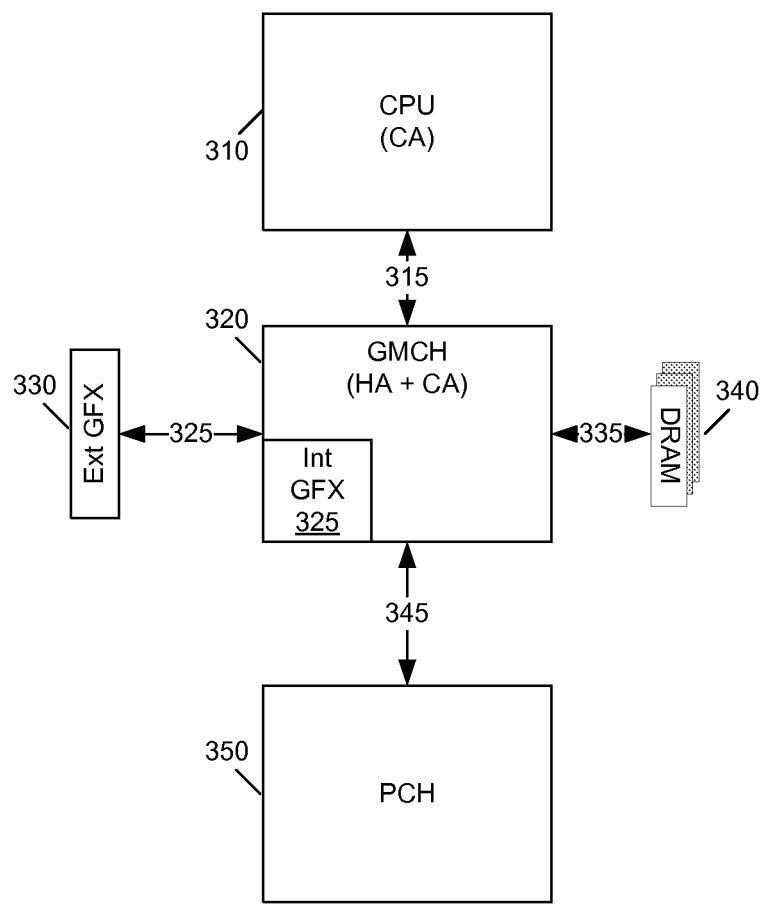
FIG. 3 is a block diagram of a system in accordance with one embodiment of the present invention.

Referring now to FIG. 3, shown is a block diagram of a system in accordance with one embodiment of the present invention. As shown in FIG. 3, system 300 may be a computer system, which may take various forms such as a server computer, desktop computer, notebook, netbook computer, or mobile computing device, as some examples. As seen in FIG. 3, system 300 includes a processor 310, namely a CPU, which in one embodiment may be a multicore processor. Processor 310 may include one or more cache memories such that it can act as a caching agent (CA). In general, a caching agent may be an entity that initiates transactions into a coherent memory, and that can store copies of memory locations, e.g., in its own cache memory.

As further shown in FIG. 3, processor 310 may be coupled to a chipset 320 which in one embodiment may be an integrated graphics and memory controller device (GMCH) via a interconnect 315 which may be, in one embodiment a point-to-point interconnect such as a QPI interconnect. In addition to internal graphics circuitry 325, chipset 320 may provide for home agent and caching agent functionality. In general, a home agent may be an entity that handles coherent transactions and thus the home agent acts to control at least a portion of coherent memory. In the embodiment shown in FIG. 3, this coherent memory may be a system memory 340 which in one embodiment may be dynamic random access memory (DRAM), coupled to chipset 320 via a memory bus 335.

As seen, other components may couple to chipset 320, including a graphics device 330, which may be an external graphics card which may couple via an interconnect 325 such as a graphics bus. In addition, a peripheral controller hub (PCH) 350 may couple to chipset 320, e.g., via an interconnect 345. In turn, PCH 350 may communicate with various peripheral devices such as mass storage, network components, Peripheral Component Interconnect Express (PCIe) card, input/output devices and so forth. While shown with this particular implementation in the embodiment of FIG. 3, understand the scope of the present invention is not limited in this regard. In various embodiments, both processor 310 and chipset 320 may include link and protocol layers such as described above with regard to FIG. 1 to thus reduce the need for on-chip buffers for the link layers. Further, embodiments may be implanted in systems with multiple processors, chipsets and so forth, and where a processor or chipset may include a home agent. For example, in some implementations a processor may include a home agent and may be directly coupled to a memory without an intervening chipset.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a link layer to receive and forward a message to a protocol layer coupled to the link layer and including a decoder to determine a message type for the message, wherein the link layer is to directly provide a credit return to a sender of the message if the message is a non-data message; and
    the protocol layer including a shared buffer to store data messages received from the link layer, wherein the protocol layer is to send a credit return for a data message based on the data message being removed from the shared buffer, the credit return to be sent to the message sender via the link layer;
    wherein the link layer is to directly, without traversing the protocol layer, provide the credit return to a credit return counter, included in the link layer, if the message is a non-data message.

2. The apparatus of claim 1, wherein the protocol layer further includes a first tracker associated with at least one a remote agent coupled to the link layer to store information associated with request messages from the at least one remote agent, wherein the first tracker is to not separately store data of data messages stored in the shared buffer.

3. The apparatus of claim 2, wherein the protocol layer further includes a second tracker associated with at least one local agent coupled to the link layer to store information associated with request messages from at least one local agent, wherein the second tracker is to not separately store data of data messages stored in the shared buffer.

4. The apparatus of claim 2, wherein the first tracker includes a plurality of entries per agent each to store a request identifier associated with a message, where the request identifier is a unique identifier corresponding to an identifier for the sender of the message and a transaction identifier for the message.

5. The apparatus of claim 4, further comprising at least one ordering queue, coupled to the first tracker, wherein the ordering queue is to store a request identifier corresponding to an entry in the first tracker and to maintain a received order of the ordering queue entries.

6. The apparatus of claim 5, wherein the apparatus is to access information stored in an entry of the first tracker when a request identifier of the entry is output from the ordering queue.

7. The apparatus claim 1, wherein a communication protocol includes the link and protocol layers, the link layer is to perform error correction, and the protocol layer is to perform packet routing.

8. A method comprising:
    receiving an incoming message in a link layer that is coupled to an interconnect and a protocol layer;
    determining a message type for the message in the link layer and if the message type is a non-data type, sending a credit return to a counter included in the link layer and to the sender directly from the link layer without traversing the protocol layer; and
    if the message type is determined to be a data type, forwarding the message to the protocol layer, storing the data in a shared data buffer of the protocol layer, and then sending a data type credit return to the counter via the link layer;
    wherein the credit return is not stored in the shared data buffer.

9. The method of claim 8, further comprising outputting the data from the shared data buffer and sending the data type credit return to the sender via the link layer based on completion of outputting the data from the shared data buffer.

10. The method of claim 8, further comprising forwarding the data message to the protocol layer without buffering the data message in the link layer.

11. The method of claim 8, further comprising:
    storing first information associated with the message in a first tracker of the protocol layer, the information including a request identifier for the message; and
    storing the request identifier in an entry of an ordering queue.

12. A system comprising:
    a processor to execute instructions, the processor including at least one caching agent to store copies of information stored in a system memory;
    a home agent coupled to the processor to guard at least a portion of the system memory, a link layer to receive and forward a message from the processor to a protocol layer coupled to the link layer and including a decoder to determine a message type for the message, wherein the link layer is to directly provide a credit return to the processor if the message is a non-data message, and the protocol layer including a shared buffer to store data messages received from the link layer, wherein the protocol layer is to send a credit return for a data message based on the data message being removed from the shared buffer, the credit return to be sent to the processor via the link layer; and
    the system memory coupled to the home agent, wherein the system memory comprises dynamic random access memory (DRAM);

wherein the link layer is to directly, without traversing the protocol layer, provide the credit return to a credit return counter, included in the link layer, if the message is a non-data message.

13. The system of claim 12, wherein the protocol layer further includes a first tracker associated with the processor to store information associated with request messages from the processor, wherein the first tracker is to not separately store data of data messages stored in the shared buffer.

14. The system of claim 13, wherein the protocol layer further includes a second tracker associated with the local agent to store information associated with request messages from the local agent, wherein the second tracker is to not separately store data of data messages stored in the shared buffer.

15. The system of claim 13, wherein the first tracker includes a plurality of entries each to store a request identifier associated with a message, where the request identifier is a unique identifier corresponding to an identifier for the processor and a transaction identifier for the message.

16. The system of claim 15, further comprising at least one ordering queue coupled to the first tracker, wherein the ordering queue is to store a request identifier corresponding to an entry in the first tracker, and further comprising a chipset coupled to the processor via a point-to-point interconnect, the chipset to access information stored in an entry of the first tracker when a request identifier of the entry is output from the ordering queue.

17. The system of claim 12, wherein the protocol layer is to store first information associated with the message in a first tracker, the information including a request identifier for the message, and to store the request identifier in an entry of an ordering queue and the protocol layer is to access the first information in the first tracker using the request identifier.

18. The system of claim 12, wherein the processor includes a home agent, and further comprising at least one other processor coupled to the processor and a chipset coupled to the plurality of processors.

19. The system of claim 12, further comprising a chipset coupled to the processor, wherein the chipset includes the home agent.

* * * * *